US009072110B2

(12) United States Patent
Chen et al.

(10) Patent No.: US 9,072,110 B2
(45) Date of Patent: Jun. 30, 2015

(54) METHOD FOR UE PATTERN INDICATION AND MEASUREMENT FOR INTERFERENCE COORDINATION

(75) Inventors: Yih-Shen Chen, Hsinchu (TW); Per Johan Mikael Johansson, Kungsangen (SE)

(73) Assignee: MEDIATEK INC. (TW)

( * ) Notice: Subject to any disclaimer, the term of this patent is extended or adjusted under 35 U.S.C. 154(b) by 466 days.

(21) Appl. No.: 13/373,218

(22) Filed: Nov. 7, 2011

(65) Prior Publication Data
US 2012/0115469 A1 May 10, 2012

Related U.S. Application Data

(60) Provisional application No. 61/411,052, filed on Nov. 8, 2010, provisional application No. 61/411,539, filed on Nov. 9, 2010.

(51) Int. Cl.
H04W 72/08 (2009.01)
H04W 36/00 (2009.01)
(Continued)

(52) U.S. Cl.
CPC ........ *H04W 72/085* (2013.01); *H04W 36/0088* (2013.01); *H04W 36/0094* (2013.01); *H04W 48/02* (2013.01); *H04W 74/0866* (2013.01); *H04W 76/048* (2013.01)

(58) Field of Classification Search
CPC ... H04W 84/045; H04W 24/10; H04W 36/04; H04W 36/0094; H04W 72/085; H04W 36/0088; H04W 76/048; H04W 74/0866; H04W 48/02
USPC .......... 455/443–444, 425, 434, 67.11, 552.1, 455/446–449
See application file for complete search history.

(56) References Cited

U.S. PATENT DOCUMENTS

2006/0121907 A1 6/2006 Mori et al. .................... 455/447
2008/0268833 A1 10/2008 Huang et al. .................. 455/425
(Continued)

FOREIGN PATENT DOCUMENTS

CN 101420746 A 10/2007
CN 101494478 A 1/2008
(Continued)

OTHER PUBLICATIONS

International Search Report and Written Opinion of International Search Authority for PCT/CN2011/081915, dated Mar. 1, 2012 (10 pages).

(Continued)

*Primary Examiner* — George Eng
*Assistant Examiner* — Nam Huynh
(74) *Attorney, Agent, or Firm* — Zheng Jin

(57) ABSTRACT

A method of inter-cell interference coordination is provided for UE measurements and network access procedure. In a first embodiment, a UE in idle mode performs measurements on received radio signals applying a simplified radio resource restriction for interference coordination. The UE determines the restricted radio resource without receiving explicit measurement configuration. In a second embodiment, during various phases of a network access procedure, the UE indicates its interference status and/or additional interference information to its serving base station to enhance interference coordination. In a third embodiment, the UE in connected mode performs measurements on both interference-protected transmission resources and non-interference-protected transmission resources. The UE measurement results are used for scheduling, radio link monitoring, and/or mobility management to increase radio spectrum efficiency and to improve user experience.

10 Claims, 5 Drawing Sheets

(51) Int. Cl.
  *H04W 48/02*  (2009.01)
  *H04W 74/08*  (2009.01)
  *H04W 76/04*  (2009.01)

(56) References Cited

U.S. PATENT DOCUMENTS

| | | | |
|---|---|---|---|
| 2011/0110251 A1* | 5/2011 | Krishnamurthy et al. | 370/252 |
| 2011/0188481 A1* | 8/2011 | Damnjanovic et al. | 370/336 |
| 2011/0275394 A1 | 11/2011 | Song et al. | 455/509 |
| 2012/0002650 A1 | 1/2012 | Yanagisako | 370/338 |

FOREIGN PATENT DOCUMENTS

| | | |
|---|---|---|
| CN | 101616426 A | 7/2009 |
| JP | 2003174431 | 6/2003 |
| JP | 2006140829 | 6/2006 |
| JP | 2013526154 | 4/2010 |
| WO | WO2010106836 | 3/2009 |
| WO | WO2011130447 | 10/2011 |
| WO | WO2011130453 | 10/2011 |

OTHER PUBLICATIONS

JPO, Office Action for JP patent application 2013-538049 dated Feb. 12, 2014 (3 pages).

R2-096022 TSG-RAN Working Group 2 Meeting #67-bis, NTT Docomo, Inc., Release 9 Cell Reselection Enhancements, Miyazaki, Japan, Oct. 12-16, 2009 (4 pages).

JPO, Office Action for the JP patent application 2014-098497 dated Dec. 24, 2014 (6 pages).

R1-104883 3GPP TSQ-RAN1 #62; Fujitsu; Macro UE Initiated eICIC through CSG Femto eNB; Madrid, Spain dated Aug. 23-27, 2010 (3 pages).

R1-105717 3GPP TSG RAN1 #62bis; Motorola; RACH Aided Initiation of eICIC; Xian, China dated Oct. 11-15, 2010 (3 pages).

R1-105239 3GPP TSG-RAN WG1 #62bis; MediaTek Inc.; Specification Impacts of eICIC in Macro-Femto Deployment; Xi'an, China dated Oct. 11-15, 2010 (6 pages).

JPO, Office Action for JP patent application 2014-098498 dated Feb. 10, 2015 (8 pages).

R1-105442 3gPP TSG WG1 Meeting #62bis; NTT DOCOMO; Views on eICIC Schemes for Rel-10; Xian, China dated Oct. 11-15, 2010 (9 pages).

R4-103426 3GPP TSG-RAN WG4 #56; Qualcomm Incorporated; Hetnet ICIC RLM and RRM Requirements; Madrid, Spain dated Aug. 23-27, 2010 (5 pages).

R1-105150 3GPP TSG RAN WG1 meeting #62bis; Huawei, HiSilicon; The Possible Restrictions on the Configuration of Almost Blank Subframes in Macro-Pico Deployments; Xi'an, China dated Oct. 11-15, 2010 (6 pages).

R1-105406 3GPP TSG RAN WG1 Meeting #62bis; Samsung; Support of Time Domain ICIC in Rel 10; Xian, China dated Oct. 11-15, 2010 (4 pages).

* cited by examiner

METHOD FOR UE PATTERN INDICATION AND MEASUREMENT FOR INTERFERENCE COORDINATION

CROSS REFERENCE TO RELATED APPLICATIONS

This application claims priority under 35 U.S.C. §119 from U.S. Provisional Application No. 61/411,052, entitled "Method of UE pattern indication in Heterogeneous Network," filed on Nov. 8, 2010; U.S. Provisional Application No. 61/411,539, entitled "Method for Static interference Coordination," filed on Nov. 9, 2010, the subject matter of which is incorporated herein by reference.

TECHNICAL FIELD

The disclosed embodiments relate generally to wireless network communications, and, more particularly, to UE pattern indication and measurement for inter-cell interface coordination.

BACKGROUND

Inter-cell interference coordination (ICIC) was introduced in Release-8/9 of the 3GPP LTE standards. The basic idea of ICIC is keeping the inter-cell interferences under control by radio resource management (RRM) methods. ICIC is inherently a multi-cell RRM function that needs to take into account information (e.g. the resource usage status and traffic load situation) from multiple cells. Broadly speaking, the main target of any ICIC strategy is to determine the resources (bandwidth and power) at each cell at any time. Then (and typically), a scheduler assigns those resources to users. Static ICIC schemes are attractive for operators since the complexity of their deployment is very low and there is no need for new extra signaling out of the standard. Static ICIC mostly relies on the fractional frequency reuse concept, where the total system bandwidth is divided into sub-bands and used by the scheduler accordingly.

LTE Release-8/9 ICIC techniques, however, are not fully effective in mitigating control channel interference. For example, dominant interference condition has been shown when non-CSG (close subscriber group) macrocell users are in close proximity of CSG femtocells. Therefore, enhanced ICIC (eICIC) has been investigated from Release-10 onwards to provide enhanced interference management. In LTE/LTE-A Release-10, two main inter-cell interference scenarios for eICIC were being discussed: Macro-Pico scenario and Macro-Femto scenario. In general, almost-blank subframe (ABS) or silenced subframe concept is introduced to reduce inter-cell interference. When ABS is applied, the aggressor cell suspends the scheduling or transmits with smaller power so that the victim cell can conduct data transmission in the protected subframes.

In Macro-Pico scenario, a macrocell is the aggressor and may introduce strong interferences to picocells, which are called victim cells. In this scenario, macrocell UEs operate typically in connected mode. ABS is applied in the macrocell so that UEs can try to search for picocells in the protected subframes. Several radio resource management (RRM) technologies are available in LTE/LTE-A systems to mitigate inter-cell interference. In one RRM scheme, a UE may declare radio link failure (RLF) based on radio link monitoring (RLM) measurements. Another possible RRM scheme is that the UE may report measurement results to its serving base station (eNB) for better scheduling and mobility management. Since only some subframes are protected in picocell, such measurements should be modified accordingly. Otherwise, the measurement results would be largely affected by the interfering macrocell.

In Macro-Femto scenario, a non-accessible CSG femtocell is the interferer and macrocell is the victim cell, and macrocell UEs may be in connected mode or in idle mode. ABS is applied in the femtocell. The current LTE RRM design has not investigated eICIC for idle mode. However, for the case of Macro-Femto inter-cell interference, UEs in idle mode also need interference coordination to prevent from any cell selection and go out-of-service (OOS) in cases when no alternative carrier is available. For example, when a UE connected to a macrocell moves into the vicinity of a non-accessible CSG femtocell, the UE can stay connected to the macrocell thanks to inter-cell interference coordination. When the UE goes to idle mode later on, UE measurements will indicate that the macrocell is no longer suitable and the UE goes to out of service. Without interference coordination, the UE in idle mode cannot return to connected mode, unless the UE moves out of the interfering of the femtocell. Therefore, UE measurements adapted to interference coordination is desirable for UEs in idle mode.

In the presence of strong inter-cell interference, it is also desirable that enhanced network access procedure such as random access channel (RACH) procedure can be applied to improve interference coordination. In addition, for UEs in connected mode, UE measurement enhancements are also needed to increase radio spectrum efficiency and to improve user experiences.

SUMMARY

A method of enhanced inter-cell interference coordination (eICIC) is provided. To improve interference coordination, UE measurements in both RCC_IDLE state and RCC_CONNECTED state are enhanced, as well as network access procedure.

In a first embodiment, a UE in idle mode performs measurements on received radio signals applying a simplified radio resource restriction for interference coordination. The UE determines the restricted radio resources without receiving explicit measurement configuration. In one example, the restricted radio resources correspond to subframes used for system broadcast channels, paging channels and downlink common control channels.

In a second embodiment, during various phases of a network access procedure, the UE indicates its interference status and/or additional interference information to its serving base station to enhance interference coordination. In one example, the network access procedure is a random access channel (RACH) procedure. The interference information may include CSG identification (CSG_ID) or silencing pattern of a non-accessible neighbor CSG femto base station.

In a third embodiment, the UE in connected mode performs measurements on both interference-protected transmission resources and non-interference-protected transmission resources. The UE measurement results are used for scheduling, RLM, and/or mobility management to increase radio spectrum efficiency and to improve user experience.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In LTE systems, two radio resource control (RRC) states namely RRC_IDLE and RRC_CONNECTED are defined. In the RRC_IDLE state, a UE can receive broadcast or multicast data, monitors a paging channel to detect incoming calls, performs neighbor cell measurements for cell selection/reselection, and acquires system information broadcasting (MIB/SIB). Mobility function is totally controlled by the UE in the RRC_IDLE state. In the RRC_CONNECTED state, the transfer of unicast data to/from UE, and the transfer of broadcast/multicast data to UE can take place. The UE monitors control channels associated with the shared data channel to determine scheduled data, provides channel quality feedback information, performs neighbor cell measurements and measurement reporting, and acquires MIB/SIB updating. Unlike the RRC_IDLE state, mobility and handover fucntions in the RRC_CONNECTED state are controlled by network and the UE provides assistance information such as measurement reports.

A UE transits from RRC_IDLE state to RRC_CONNECTED state when an RRC connection is successfully established. The RRC connection is typically established via a network access procedure such as a random access channel (RACH) procedure. In LTE Release-10, enhanced inter-cell interference coordination (eICIC) has been investigated. To improve interference coordination, UE measurements in both RCC_IDLE state and RCC_CONNECTED state are enhanced, as well as the RACH procedure.

Figure 1:
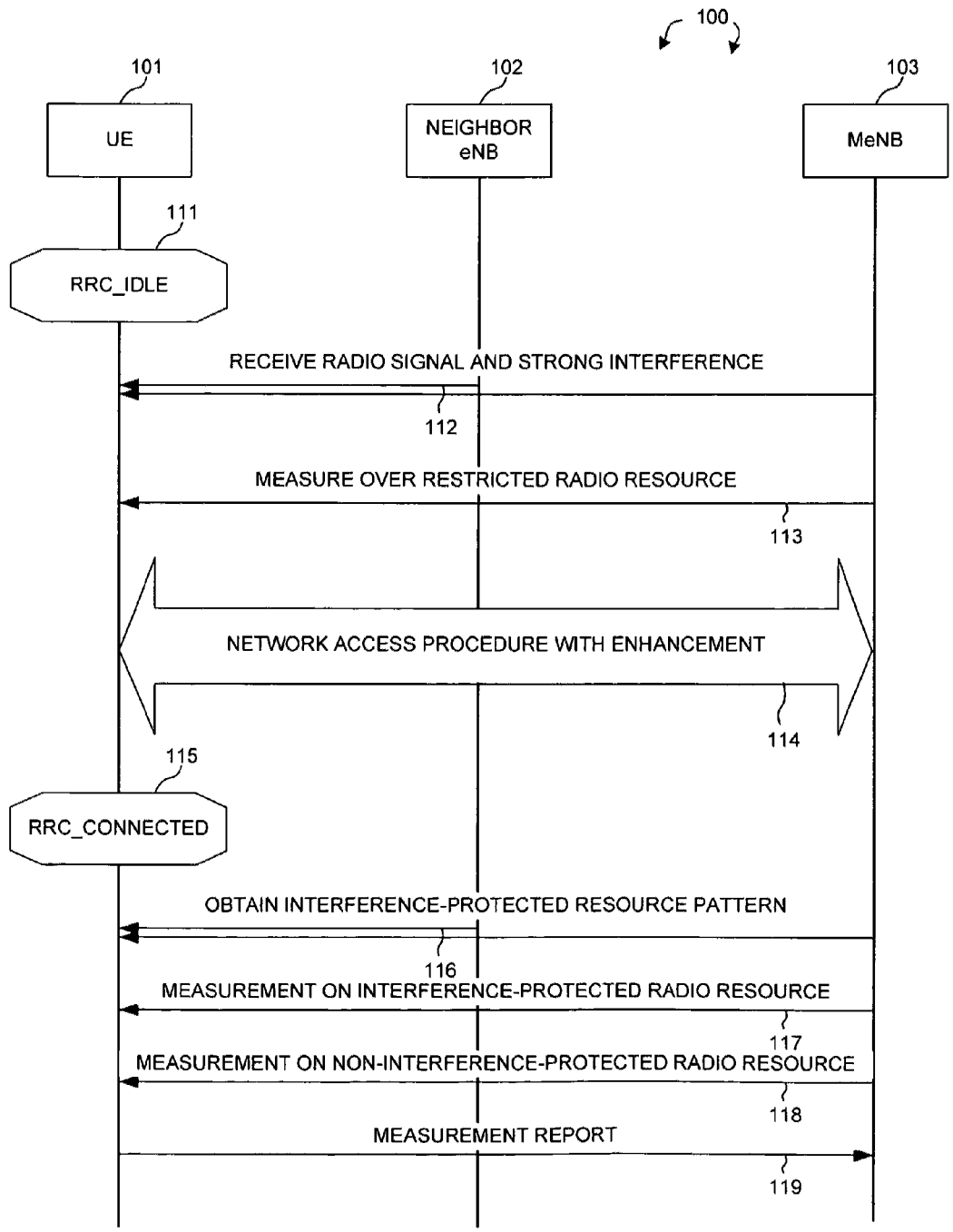
FIG. 1 illustrates an overall interference coordination scheme in a wireless network in accordance with one novel aspect.

FIG. 1 illustrates an overall inter-cell interference coordination scheme in a wireless network 100 in accordance with one novel aspect. Wireless network 100 comprises a user equipment UE 101, a neighbor base station eNB 102, and a Macro base station MeNB 103. UE101 is located within the coverage of a macrocell provided by MeNB 103. Neighbor eNB102 represents a neighbor base station of MeNB103. In a typical example, eNB102 is a Femto base station or a Pico base station that provides smaller cell coverage inside the macrocell of overlaying MeNB103. Such network deployment creates Macro-Femto or Macro-Pico inter-cell interference scenario.

In step 111, UE101 is in RRC_IDLE mode, and UE101 has not established any RRC connection. In step 112, UE101 receives radio signals in the macrocell from MeNB103, together with strong interfering signals from eNB102 (e.g., eNB 102 is a non-accessible CSG femto base station). In step 113, UE101 performs measurements on the received radio signals, applying a simplified radio resource restriction for interference coordination. In one embodiment, the restricted radio resource is determined by UE101 without any explicit configuration. In one example, the restricted radio resources correspond to subframes used for system broadcast channels, paging channels and downlink common control channel. In step 114, UE101 performs a network access procedure with MeNB103. In one embodiment, an enhanced RACH procedure is performed, during which UE101 is able to indicate its interference status and/or additional interference information to MeNB103 to improve interference coordination. In step 115, UE101 enters RRC_CONNECTED mode by establishing a RRC connection with its serving base station MeNB103 after the RACH procedure. In step 116, UE101 decodes a broadcast channel (BCH) of neighbor base station eNB102 and obtains any interference-protected resource pattern (e.g., almost-blank subframes (ABS) or silenced subframes) applied by eNB102. In another embodiment, UE101 obtains the interference-protected resource pattern information of eNB102 from the signaling message of MeNB103. UE101 also receives measurement configuration from its serving base station MeNB103 and obtains any interference-protected or non-interference-protected radio resource pattern applied by MeNB103. In step 117, UE101 performs measurements on interference-protected radio resource. In step 118, UE101 performs measurements on non-interference-protected radio resource. In step 119, UE101 sends measurements result to its serving MeNB103.

Figure 2:
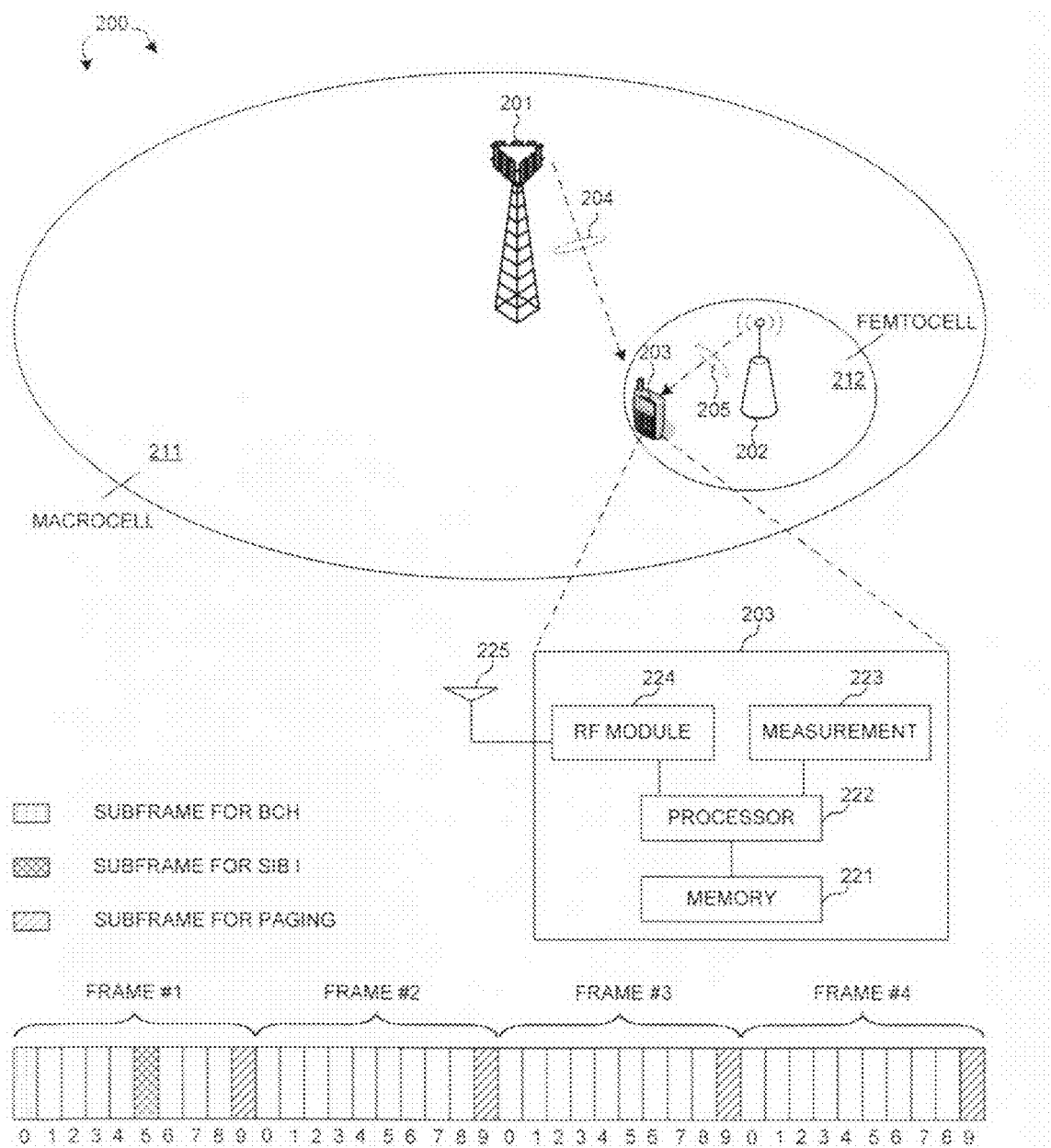
FIG. 2 illustrates one embodiment of a method of UE measurement for inter-cell interference coordination in RCC_IDLE mode.

FIG. 2 illustrates one embodiment of a method of UE measurement for interference coordination in RCC_IDLE mode in a wireless network 200. Wireless network 200 comprises a macro base station MeNB 201, a CSG femto base station FeNB202, and a UE 203. In the example of FIG. 2, femtocell 212 controlled by FeNB202 is a smaller cell located inside a larger overlaying macrocell 211 controlled by MeNB201. While UE203 is within the cell coverage of macrocell 211, it is also located within the cell coverage of femtocell 212. UE203 is initially in RCC_IDLE mode and performs measurements for cell selection. For example, UE203 receives radio signal 204 from MeNB201 and receives radio signal 205 from FeNB202. From the received radio signals, UE203 finds that femtocell 212 is the strongest cell. Unfortunately, femtocell 212 is not in UE203's whitelist because FeNB202 is a non-accessible CSG femto base station. Femtocell 212 thus becomes an interfering cell. UE203 needs to find a way to search for accessible cell (i.e., macrocell 211) and then inform MeNB201 the existence of FeNB202.

In one novel aspect, UE203 performs measurement with simplified radio resource restriction for interference coordination. The objective of the method is to minimize the need for reconfigurations to control UE measurements, in the context of interference coordination. One objective is to avoid UE measurement reconfigurations, even if the radio resource restriction that applies to transmission of data is changed. Another objective is to avoid UE measurement reconfigurations, even if the UE moves across cells that apply different radio resource restriction for transmission of data. In a preferred embodiment, the need for reconfigurations is zero, i.e., the UE applies a static radio resource restriction for measurements. The benefits of the method are most pronounced for UEs in idle mode. As low complexity and low battery consumption is essential in idle mode, such method provides the most simple approach with minimum need for reconfigurations. It is noted, however, that such method is generally applicable for measurements in connected mode.

FIG. 2 also illustrates a simplified block diagram of UE203 having various functional modules to carry out embodiments of the present invention. UE203 comprises memory 221, a processor 222, a measurement module 223, a radio frequency (RF) module 224 coupled to an antenna 225. Antenna 225 transmits and receives RF signals. RF module 224 receives EF signals from antenna 225, converts them to baseband signals, and sends them to processor 222. RF module 224 also converts the received baseband signals from processor 222, converts them to RF signals, and sends out to antenna 225. Processor 222 processes baseband signals and invokes different function modules to perform functionalities supported by UE203. Memory 221 stores program instructions and data to control the operation of UE203. In one novel aspect, measurement module 223 performs UE measurements with simplified radio resource restriction for interference coordination. The measurement results are reported to a serving base station for radio resource management (RRM) purposes.

In general, for interference coordination, almost-blank subframes (ABS) or silenced subframes are applied by devices that cause interference (e.g., the aggressors) to protect devices that are subjected to interference (e.g., the victims). ABS or silenced subframes are also referred to as a type of protected radio resource, or interference-protected radio resource. Interference-protected resource is defined as a resource that is not used, not fully used, or partially used by a cell (e.g., used with power restriction, or only reference symbols are transmitted), in order to create a better interference situation for UEs connected to or camping on neighbor cells.

In the example of FIG. 2, femtocell 211 is the aggressor and applies certain ABS or silenced subframes to reduce interference to UE203. Ideally, UE203 should always perform measurements in the silenced subframes to obtain the most accurate measurement results. UE203, however, may not know about the silencing pattern of FeNB202 (e.g., a UE does not read the BCCH of non-accessible CSG in idle mode). In addition, for LTE eICIC, the silencing pattern could change due to changes in load condition, etc.; especially such silencing pattern could be different for different cells for optimal performance.

In one embodiment in accordance with a novel aspect, the restricted radio resource selected for UE measurements is a subset of radio resources that could be used for transmission/reception for the UE if/when the UE is using the cell as its serving cell. Typically, for UEs in high interference situations, where interference coordination is needed, the resources that would be selected to be available for transmission in one cell would be the same resources that are subject to silencing in interferer cell. In addition, the subset is a simpler and more static radio resource. Therefore, there is no need to configure specifically for each cell that the UE measures. Instead, it could be assumed that all cells in a certain area could share the same subset of resources.

In one specific embodiment, the subset of radio resources is selected to correspond to certain transmissions that are pre-known to use certain radio resources. As illustrated in FIG. 2, macro base station MeNB201 and UEs communicate with each other by sending and receiving data carried in a series of superframes, each contains four frames Frame #1-#4. Each frame in turn contains a plurality of subframes. For LTE, the primary broadcast channel (BCH), the primary and secondary synchronization symbols (PSS/SSS), the transmission of System Information Block (SIB) type 1, and the transmission of physical downlink control channel (PDCCH) and paging control channel (PCH), are all performed in fixed locations/subframes. For example, BCH appears in subframe #0 (SF0), SIB1 in subframe #5 (SF5), and PCH in subframe #9 (SF9) for FDD. Such essential channels would anyway always need to be protected and the neighbor cells should try to refrain from scheduling in those subframes; therefore, it could be assumed that such subframes would be suitable for measurements. A benefit of such approach is that the resource restriction for measurement can be completely static and hard-coded, with minimum complexity, and with no explicit signaling needed.

The novel UE measurements method may be applied by a UE for cell selection/reselection in idle mode. By applying the restricted resource for UE measurements, the UE is able to check the suitability of a potential serving cell, and out of service (OOS) events or any cell selection can be avoided, which leads to better user experience. After the UE finds a suitable cell, the UE performs a network access procedure with a serving base station to establish RRC connection. In the presence of strong interference, the UE applies enhanced network access procedure to improve interference coordination.

Figure 3:
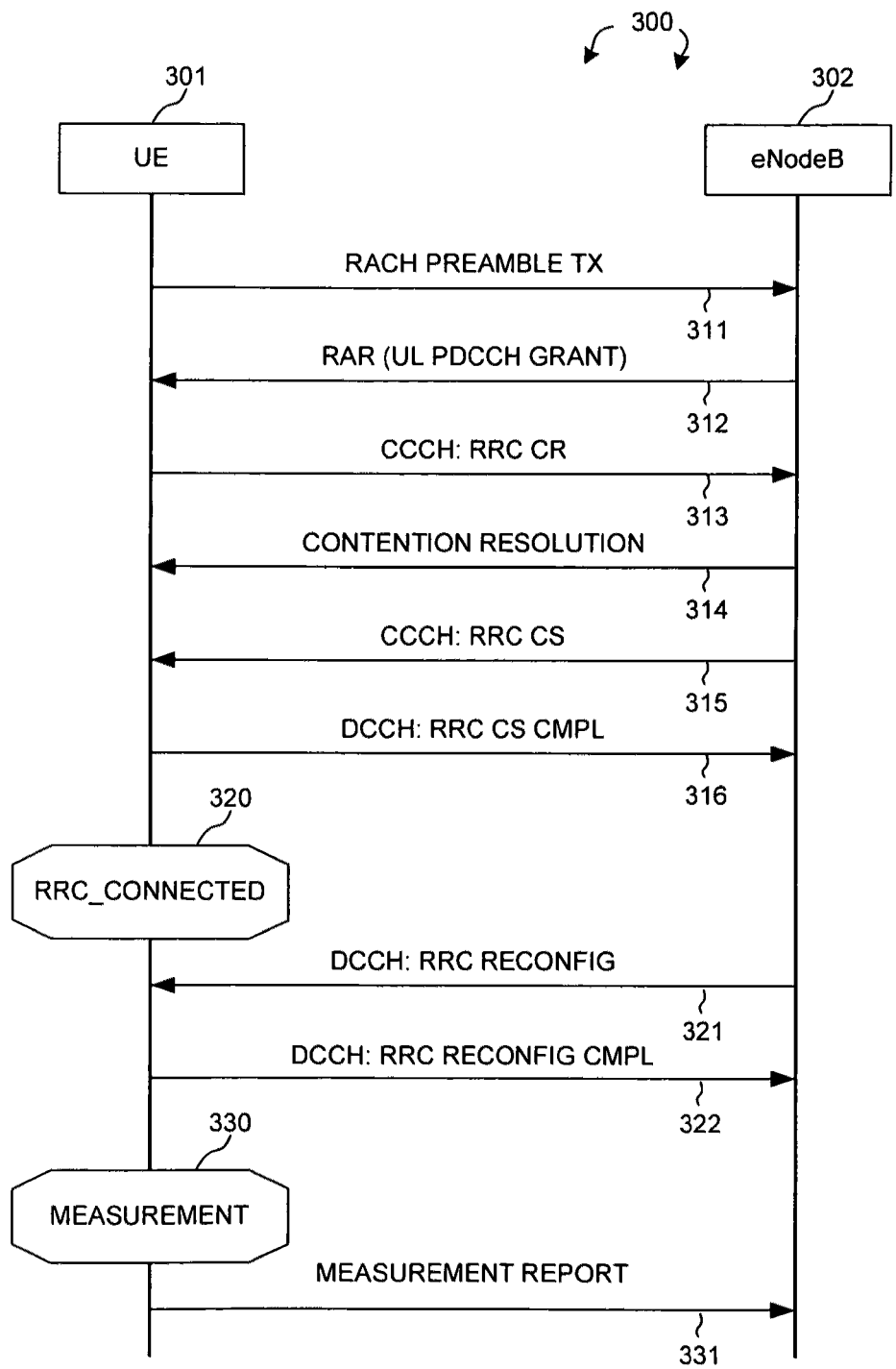
FIG. 3 illustrates one embodiment of interference coordination enhancement during a RACH procedure.

FIG. 3 illustrates one embodiment of interference coordination enhancement during a network access (e.g., RACH) procedure in a wireless network 300. Wireless network 300 comprises a UE 301 and a base station eNB 302. In general, without any information from UE301, eNB302 tries to schedule "carefully". For example, eNB302 schedules downlink RRC signaling at the same subframes where PCH/BCH transmits, and hope that there is high likelihood that such subframes are silenced by a neighbor non-accessible CSG femtocell. On the other hand, if UE301 can provide more information, then eNB302 can try to schedule "intelligently" to improve resource usage and interference management. In one novel aspect, UE301 provides additional information to eNB302 via different steps of the enhanced RACH procedure.

In step 311, UE301 transmits a RACH preamble to eNB302. The RACH preamble is transmitted over a RACH opportunity (e.g., a RACH resource block (RB)). If UE301 experiences strong interference from neighbor cells (e.g., UE's strongest cell is a non-accessible CSG), then UE301 indicates such status to eNB302. In a first option, a dedicated preamble group is defined for all UEs whose strongest cell is non-accessible CSG. If UE301 chooses a RACH preamble belongs to the dedicated preamble group, then eNB302 can deduce such status from the received RACH preamble. In a second option, a dedicated RACH resource is defined for all UEs whose strongest cell is non-accessible CSG. If UE301 transmits the RACH preamble over a RACH RB belongs to the dedicated RACH resource, then eNB302 can also deduce such status from the RACH RB. In step 312, eNB302 transmits a random access response (RAR) message via an uplink PDCCH grant to UE301.

In step 313, UE301 sends a RRC connection request (RRC CR) message (e.g., message 3) to eNB302 via an uplink common control channel (CCCH). It is assumed that all messages on the CCCH are size constrained. In a first option, UE301 uses a reserved bit in the RRC CR message to indicate that the strongest cell for the UE is a non-accessible CSG. In a second option, if eNB302 already figures out the problematic scenario in the RACH preamble phase, then eNB302 can allocate larger RB for UE301. UE301 is then able to indicate CSG information as an additional IE in the RRC CR message. The CSG information could be the CSG ID or the ABS pattern of the CSG femto, which brings more scheduling flexibility for eNB302. In step 314, eNB302 sends a contention resolution message to UE301, followed by sending a RRC connection setup (RRC CS) message to UE301 via the CCCH in step 315.

In step 316, UE301 sends a RRC connection setup complete (RRC CS CMPL) message to eNB302 via a downlink control channel (DCCH). The RRC connection setup complete message on the DCCH is not size constrained. In one embodiment, UE301 sends the CSG information as part of the RRC CS CMPL message. The CSG information could be the CSG ID or the ABS pattern of the CSG femto, which brings more scheduling flexibility for eNB302. Note that, if eNB302 detects that the UE is strongly interfered by the method in step 311, then eNB302 can intelligently schedule the messages of step 312 to step 316 onto protected subframes so that they can be decoded correctly.

After completing the above-illustrated steps in the RACH procedure, UE301 has camped on eNB302, established RRC connection and moved to RRC_CONNECTED state in step 320. In step 321, UE301 receives a RRC reconfiguration (RECONFIG) message from eNB302 for UE measurement configuration or reconfiguration. In step 322, UE301 responses with a RRC reconfiguration complete (RECONFIG CMPL) message back to eNB302. UE301 starts to perform measurements in step 330. In one novel aspect, when UE301 detects the existence of non-accessible CSG femto, UE301 tries to decode the broadcast control channel (BCCH) of the CSG femto and check if ABS is enabled. If ABS is enabled, then UE301 tries to measure the CSG femto in non-ABS subframes. Additionally, UE301 could also separately measure the serving cell of eNB302 by all subframes and ABS-only subframes. In step 331, UE301 sends measurement report to eNB302. The measurement report is a natural place to report the ABS pattern of the CSG femto to eNB302. Based on the measurement report, eNB302 can make appropriate scheduling or handover decisions accordingly. More details of UE measurements in connected mode are now illustrated below in FIG. 4.

Figure 4:
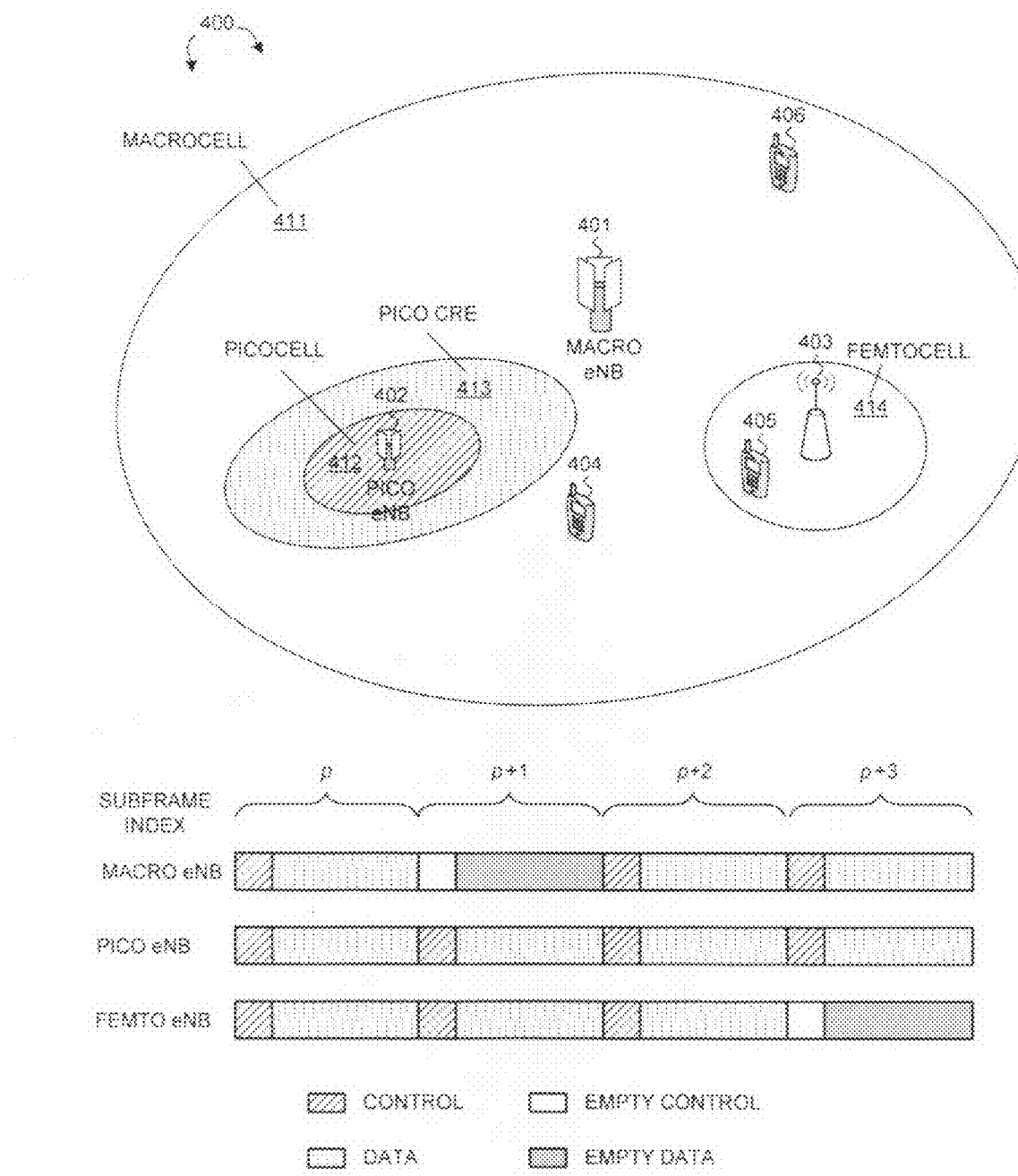
FIG. 4 illustrates one embodiment of a method of UE measurement for inter-cell interference coordination in RCC_IDLE mode.

FIG. 4 illustrates one embodiment of a method of UE measurement for inter-cell interference coordination in RCC_CONNECTED mode in a wireless network 400. Wireless network 400 comprises a macro base station MeNB 401, a Pico base station PeNB 402, a Femto base station FeNB 403, and a plurality of UEs 404-406. MeNB401 provides coverage for macrocell 411, PeNB402 provides coverage for picocell 412 and a cell region extension (CRE) 413 of the picocell, and FeNB403 provides coverage for femtocell 414. In the example of FIG. 4, picocell 412 and PICO CRE 413 are located inside overlaying macrocell 411, creating a Macro-Pico inter-cell interference scenario. Similarly, femtocell 212 is located inside overlaying macrocell 411, creating a Macro-Femto inter-cell interference scenario. For interference coordination, MeNB401 applies certain ABS or silencing pattern (e.g., subframe p+1) to protect Pico UEs, and FeNB403 applies certain ABS or silencing pattern (e.g., subframe p+3) to protect Macro UEs located inside or near the femtocell.

In current LTE Release 8/9, there is no measurement restriction for the measuring of common reference signals (CRS). UE measurement details are up to UE implementation. However, for inter-cell interference situations, it is beneficial for UEs to take into account measurement results for both interference-protected transmission resources, and non-interference-protected transmission resources. One example of interference-protected resources is the ABS or silenced subframes applied in macrocells for Macro-Pico scenario or applied in femtocells for Macro-Femto scenario. There are two ways for UEs to make measurements in accordance with this novel aspect. In a first option, the UEs make specific measurements for interference-protected resources, as well as specific measurements for non-interference-protected resources. In a second option, the UEs make specific measurements for interference-protected resources, and unrestricted measurements that are assumed to apply for both interference-protected and non-interference-protected resources. The benefit for the second option is that in very complex network environment, UEs may not know to what extent other neighbor cells employ inter-cell interference coordination. In RRC_CONNECTED state, accurate UE measurements are important so that various RRM schemes can be applied to mitigate inter-cell interference.

In a first embodiment, the novel UE measurements can be used in CSI/CQI measurement for eNB scheduling. Take the Macro-Pico scenario in FIG. 4 as an example. MeNB401 applies ABS in subframe P+1, which becomes the interference-protected subframe for picocell 412 and PICO CRE 413. Other subframes p, p+2, and p+3 are non-interference protected subframes. UE404 measures the CSI/CQI over different resources. In one example, if the serving-cell-non-interference-protected resources (i.e., subframes p and p+2) have sufficient quality (i.e., seems to not be highly used), then they could be used, resulting in increased resource usage. In another example, if neighbor cells do not seem to make use of the serving-cell-interference-protected resources (i.e., subframe p+1), as indicated by radio measurements for these resources, then such protected resources could be used. In this example, those protected resources are used in a secondary priority fashion; that is, macrocell stops scheduling for UE404 in those protected resources whenever neighbor cell activity is detected. In yet another example of Macro-Femto scenario, if the difference between measurement results for neighbor-cell-interference-protected resources and neighbor-cell-non-interference-protected resources start to become very big, then this is an indication that it is beneficial to stop using neighbor-non-interference-protected resources for UE404.

In a second embodiment, the novel UE measurements can be used in RLM measurements for RLF procedure. In one RRM scheme, when radio link failure (RLF) is declared, a UE may reselect to a cell in another frequency band. If the measured radio signal strength or quality of the serving cell becomes too low, then UE cannot maintain connection with the serving cell. In RCC_CONNECTED mode, radio link monitoring (RLM) measurements are done for this particular purpose. In the example of FIG. 4, UE405 may receive poor signal quality from MeNB402 because of the strong interference from nearby FeNB402. In one novel aspect, UE405 performs RLM measurements only on interference-protected radio resources (e.g., silenced subframe p+3 by FeNB403). It is assumed that UE405 can always measure such resources, thus UE405 should not apply RLF recovery procedure until the channel quality of the protected resources are deteriorated below than a threshold. Benefit of such approach is to reduce the number of RLFs that would be unnecessarily triggered.

In a third embodiment, the novel UE measurements can be used for RSRP/RSRQ measurements for mobility management. A possible corresponding RRM scheme is that the UE may report measurement results (e.g., poor reference signal received power or reference signal received quality (RSRP/RSRQ) of a serving cell) to its serving base station (eNB). In the example of FIG. 4, UE406 is located at the edge of its serving cell 411. In one novel aspect, serving cell RSRP/RSRQ measurement to be done for resources that are protected or usable at the cell edge for UEs in the serving cell, and neighbor cell RSRP/RSRQ measurement to be done for resources that are protected or usable at the cell edge for UEs in the neighbor cell. In one example, UE406 measures the RSRP/RSRQ of serving cell 411 on all subframes (Measurement X1), and on ABS-only subframes (Measurement X2) and report both measurements to MeNB401. Based on Measurements X1 and X2, MeNB401 decides to initiate handover or scheduling UE406 onto the ABS slots. For example, if X2 is much larger than X1, MeNB401 only schedules UE406 onto ABS slot. On the other hand, if X2 is also bad, then MeNB 401 handover UE 406 to another frequency band. Benefit of such approach is that handover decisions could become better, improving the RRM efficiency and user experience. Mobility measurements could be fairly compared to reflect the true situation that a UE would experience in its scheduling at the cell edge, e.g., before and after a potential handover.

Figure 5:
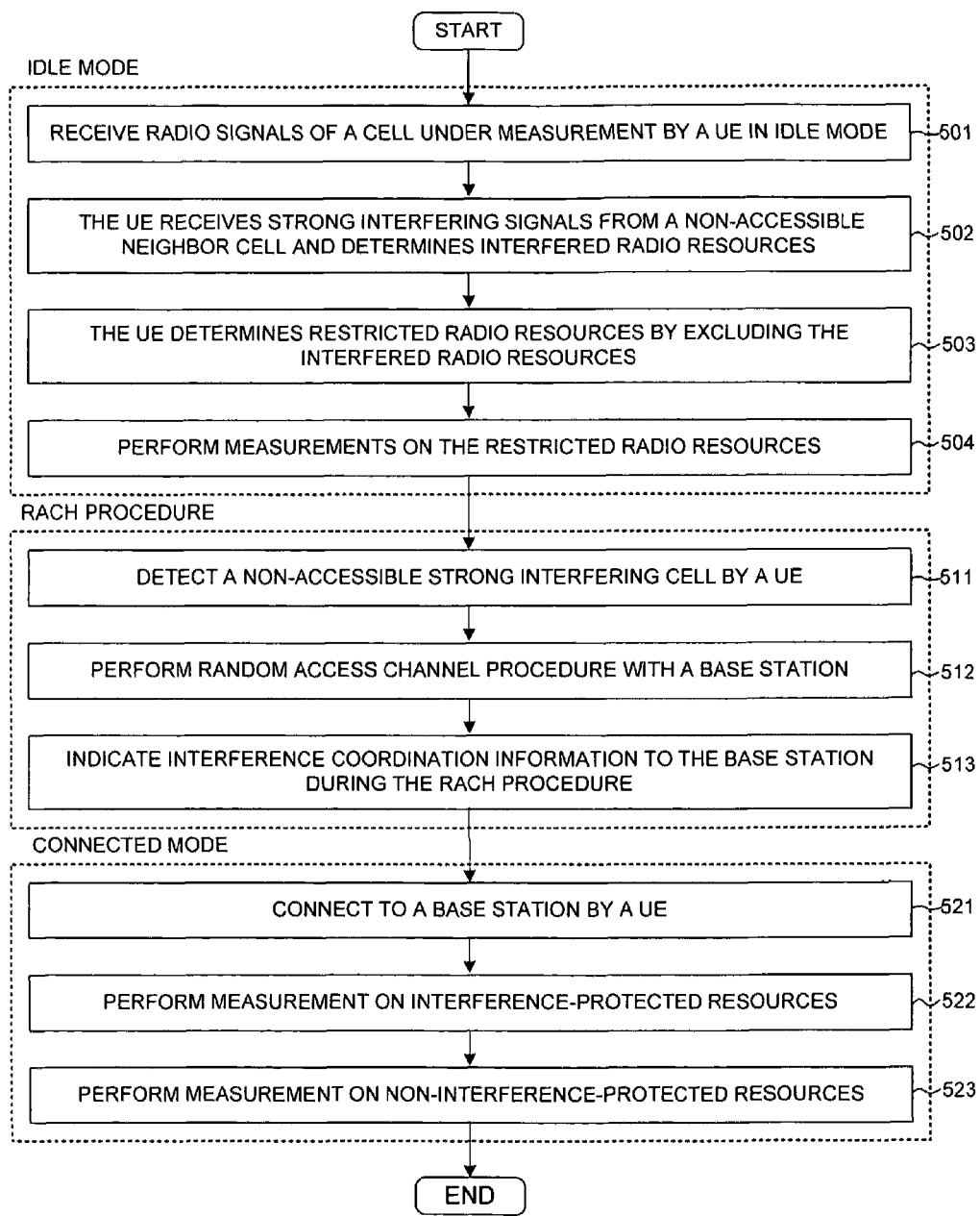
FIG. 5 is a flow chart of a method of UE measurements and network access procedure for interference coordination in accordance with one novel aspect.

FIG. 5 is a flow chart of a method of UE measurements and network access procedure for interference coordination in accordance with one novel aspect. A UE is initially in idle mode. In step 501, the UE receives radio signals of a cell under measurement. In step 502, the UE receives interfering radio signals from a non-accessible neighbor cell. The UE determines interfered radio resources. In step 503, the UE determines restricted radio resources by excluding the interfered radio resources. In step 504, the UE performs measurement of the cell on the restricted radio resources. In one embodiment, the restricted radio resources correspond to subframes used for system broadcast channels, paging channels and downlink common control channel.

During a network access procedure, in step 511, the UE detects a non-accessible strong interfering cell. In step 512, the UE performs a RACH procedure with a base station. In step 513, the UE indicates interference coordination information to the base station during various phases of the RACH procedure. During the RACH preamble transmission phase, the UE indicates that its strongest cell is a non-accessible CSG via the selected dedicated RACH preamble or dedicated RACH resource. During the RRC connection request phase, the UE indicates that its strongest cell is a non-accessible CSG via a reserved bit in the RRC CR message. The UE may also indicate the CSG information via an additional IE in the RRC CR message if larger RB is allocated. The CSG information could be the CSG ID or the ABS pattern of the CSG femto. During the RRC connection complete phase, the UE sends the CSG information as part of the RRC CS CMPL message.

After the UE has established RRC connection with its serving base station, the UE moves to connected mode in step 521. In step 522, the UE performs measurements on interference-protected radio resources. In step 523, the UE performs measurements on non-interference-protected radio resources. In one embodiment, UE CSI/CQI measurements are applied for scheduling purpose. In another example, UE RLM measurements are applied for RLF procedure. In yet another example, UE RSRP/RSRQ measurements are applied for mobility management. The benefits as compared to serving eNB always "blindly" participate in interference coordination are increased radio spectrum efficiency and improved user experience.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving radio signals of a cell under measurement by a user equipment (UE) in a wireless communication system, wherein the UE is in idle mode;
   detecting a plurality of interfered radio resources by the UE for interference coordination, wherein the UE receives strong interfering signals from a non-accessible neighboring cell;
   determining a plurality of restricted radio resources by excluding the plurality of interfered radio resources from radio resources of the wireless communication system, wherein the plurality of restricted radio resources is autonomously determined to be a subset of subframes in time domain of interference-protected radio resources of cell, and wherein the restricted radio resources correspond to subframes used for system broadcast channels, paging channels and downlink common control channel; and
   performing measurements of the cell using the determined restricted radio resources.

2. The method of claim 1, wherein the neighboring cell is a close subscriber group (CGS) femtocell in the vicinity of the cell.

3. The method of claim 1, wherein the restricted radio resources belong to a subset of radio resources that are used for data transmission and reception if the UE is measuring the cell as serving cell candidate.

4. The method of claim 1, wherein the restricted radio resources are determined without receiving explicit measurement configuration.

5. The method of claim 1, wherein the UE performs the measurements for cell selection/re-selection.

6. A user equipment (UE) comprising:
   an antenna that receives radio signals of a cell under measurement in a wireless communication system, wherein the UE is in idle mode;
   a radio frequency (RF) module that detects a plurality of interfered radio resources for interference coordination, wherein the UE receives strong interfering signals from a non-accessible neighboring cell;
   a processor that determines a plurality of restricted radio resources by excluding the plurality of interfered radio resources from radio resources of the wireless communication system, wherein the plurality of restricted radio resources is autonomously determined to be a subset of subframes in time domain of interference-protected radio resources of the cell, and wherein the restricted radio resources correspond to subframes used for system broadcast channels, paging channels and downlink common control channel; and
   a measurement module that performs measurements of the cell using the determined restricted radio resources.

7. The UE of claim 6, wherein the neighboring cell is a close subscriber group (CGS) femtocell in the vicinity of the cell.

8. The UE of claim 6, wherein the restricted radio resources belong to a subset of radio resources that are used for data transmission and reception if the UE is measuring the cell as serving cell candidate.

9. The UE of claim 6, wherein the restricted radio resources are determined without receiving explicit measurement configuration.

10. The UE of claim 6, wherein the UE performs the measurements for cell selection/re-selection.

* * * * *